(12) United States Patent
Reese et al.

(10) Patent No.: US 12,048,976 B2
(45) Date of Patent: Jul. 30, 2024

(54) POSITION FEEDBACK CONTROL METHOD AND POWER TOOL

(71) Applicant: Transform SR Brands LLC, Hoffman Estates, IL (US)

(72) Inventors: Brian Todd Reese, St. Charles, IL (US); Cody Lyle Mayer, Chicago, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

(21) Appl. No.: 18/452,619

(22) Filed: Aug. 21, 2023

(65) Prior Publication Data

US 2023/0405753 A1 Dec. 21, 2023

Related U.S. Application Data

(63) Continuation of application No. 16/537,042, filed on Aug. 9, 2019, now Pat. No. 11,752,586, which is a
(Continued)

(51) Int. Cl.
*B23B 49/00* (2006.01)
*B23B 47/32* (2006.01)
(Continued)

(52) U.S. Cl.
CPC .............. *B23Q 17/22* (2013.01); *B23B 47/32* (2013.01); *B23B 49/00* (2013.01); *B23Q 15/02* (2013.01);
(Continued)

(58) Field of Classification Search
CPC ...... B23B 2260/0487; B23B 2260/128; B23B 49/00; B23B 2270/32; B23B 49/001;
(Continued)

(56) References Cited

U.S. PATENT DOCUMENTS 3,990,805 A    11/1976   Ducrohet
4,250,971 A    2/1981    Reibetanz et al.
(Continued)

FOREIGN PATENT DOCUMENTS

CN    103097084    5/2013
DE    4336730      5/1995
(Continued)

OTHER PUBLICATIONS

Extended European Search Report for EP16195989.5, dated Mar. 16, 2017. (9 pages).
(Continued)

*Primary Examiner* — Nicole N Ramos
(74) *Attorney, Agent, or Firm* — McAndrews, Held & Malloy, Ltd.

(57) ABSTRACT

Various embodiments of power tool and method of operating same are described. The power tool may include a first position sensor, a second position sensor, a third position sensor, and a controller. The first, second, and third position sensors may each generate a signal indicative of a distance between the respective position sensor and a workpiece. The controller may determine one or more angles of the power tool with respect to the workpiece based on the first, second, and third signal and present an indication as to whether the one or more angles are within a predetermined range. The controller may further obtain a depth measurement based on the first signal, the second signal, and the third signal and generate, based on the obtained depth measurement, one or more control signals that control operation of the power tool.

10 Claims, 10 Drawing Sheets

Related U.S. Application Data continuation of application No. 14/927,932, filed on Oct. 30, 2015, now Pat. No. 10,377,008.

(51) Int. Cl.

| | | |
|---|---|---|
| *B23Q 15/02* | (2006.01) | |
| *B23Q 15/06* | (2006.01) | |
| *B23Q 15/08* | (2006.01) | |
| *B23Q 17/22* | (2006.01) | |
| *B25B 23/00* | (2006.01) | |
| *B25B 23/147* | (2006.01) | |
| *B25F 5/00* | (2006.01) | |

(52) U.S. Cl.
CPC ............ *B23Q 15/06* (2013.01); *B23Q 15/08* (2013.01); *B25B 23/0064* (2013.01); *B25B 23/147* (2013.01); *B25F 5/00* (2013.01); *B23B 2260/0482* (2013.01); *B23B 2260/0487* (2013.01); *B23B 2270/32* (2013.01); *B23B 2270/58* (2013.01)

(58) Field of Classification Search
CPC .. B23B 43/003; B23Q 17/22; B23Q 17/2233; B23Q 17/2414; B23Q 17/2428; B23Q 15/14
See application file for complete search history.

(56) References Cited

U.S. PATENT DOCUMENTS

| | | | |
|---|---|---|---|
| 4,364,540 | A | 12/1982 | Montabert |
| 4,968,146 | A | 11/1990 | Heizmann et al. |
| 5,105,130 | A | 4/1992 | Barker et al. |
| 5,159,577 | A | 10/1992 | Twist |
| 5,274,552 | A | 12/1993 | Milburn |
| 5,293,048 | A | 3/1994 | Skunes et al. |
| 6,375,395 | B1 | 4/2002 | Heintzeman |
| 6,536,536 | B1 | 3/2003 | Gass et al. |
| 6,665,948 | B1 | 12/2003 | Kozin et al. |
| 6,681,869 | B2 | 1/2004 | Würsch et al. |
| 6,786,683 | B2 | 9/2004 | Schaer et al. |
| 6,898,860 | B2 | 5/2005 | Wu |
| 6,913,088 | B2 | 7/2005 | Berger |
| 7,200,516 | B1 | 4/2007 | Cowley |
| 7,331,113 | B1 | 2/2008 | Patrick et al. |
| 7,375,361 | B2 | 5/2008 | Turner et al. |
| 7,404,696 | B2 | 7/2008 | Campbell |
| 7,482,819 | B2 | 1/2009 | Wuersch |
| 7,650,699 | B2 | 1/2010 | Yamamoto |
| 7,752,763 | B2 | 7/2010 | Yamamoto |
| 7,992,311 | B2 | 8/2011 | Cerwin |
| 8,324,845 | B2 | 12/2012 | Suzuki et al. |
| 8,820,955 | B2 | 9/2014 | Dixon et al. |
| 9,114,493 | B2 | 8/2015 | Pettersson et al. |
| 9,114,494 | B1 | 8/2015 | Mah |
| 9,233,423 | B2 | 1/2016 | Johnson et al. |
| 9,242,355 | B2 | 1/2016 | Sergyeyenko et al. |
| 9,289,833 | B2 | 3/2016 | Schmidt et al. |
| 9,352,458 | B2 | 5/2016 | Friedman et al. |
| 9,370,372 | B2 | 6/2016 | McGinley et al. |
| 9,464,893 | B2 | 10/2016 | Vanko et al. |
| 9,644,837 | B2 | 5/2017 | Vanko et al. |
| 9,826,984 | B2 | 11/2017 | McGinley et al. |
| 9,833,244 | B2 | 12/2017 | McGinley et al. |
| 9,908,182 | B2 | 3/2018 | Phillips et al. |
| 2001/0052418 | A1 | 12/2001 | Wissmach et al. |
| 2002/0162978 | A1 | 11/2002 | Butler et al. |
| 2003/0043016 | A1 | 3/2003 | Kady et al. |
| 2003/0196824 | A1 | 10/2003 | Gass et al. |
| 2004/0022593 | A1 | 2/2004 | Dionysian et al. |
| 2004/0136796 | A1 | 7/2004 | Chen |
| 2004/0215395 | A1 | 10/2004 | Strasser et al. |
| 2004/0252293 | A1 | 12/2004 | Laver et al. |
| 2005/0261870 | A1 | 11/2005 | Cramer et al. |
| 2008/0196911 | A1 | 8/2008 | Krapf et al. |
| 2012/0227389 | A1 | 9/2012 | Hinderks |
| 2013/0189041 | A1 | 7/2013 | Abe et al. |
| 2016/0175920 | A1 | 6/2016 | Scharfenberg et al. |

FOREIGN PATENT DOCUMENTS

| | | |
|---|---|---|
| DE | 102006005410 | 8/2007 |
| DE | 102012219345 | 5/2013 |
| DE | 102013213285 | 1/2015 |
| WO | 2012043286 | 4/2012 |
| WO | 2015106304 | 7/2015 |

OTHER PUBLICATIONS

"Proximity and Ambient Light Sensing (ALS) Module", St. Life Augmented, dated Aug. 2014 (79 pages).
www.sciencedirect.com., "The Optical Mouse As a Two-Dimensional Displacement Sensor", dated Jun. 3, 2003 (5 pages).
Chinese Final Office Action dated Jul. 5, 2018 for Application No. 2015108508778, 19 pages (translation provided).
Chinese Office Action dated Mar. 5, 2019 for Application No. 2015108502778, 9 pages (translation provided).

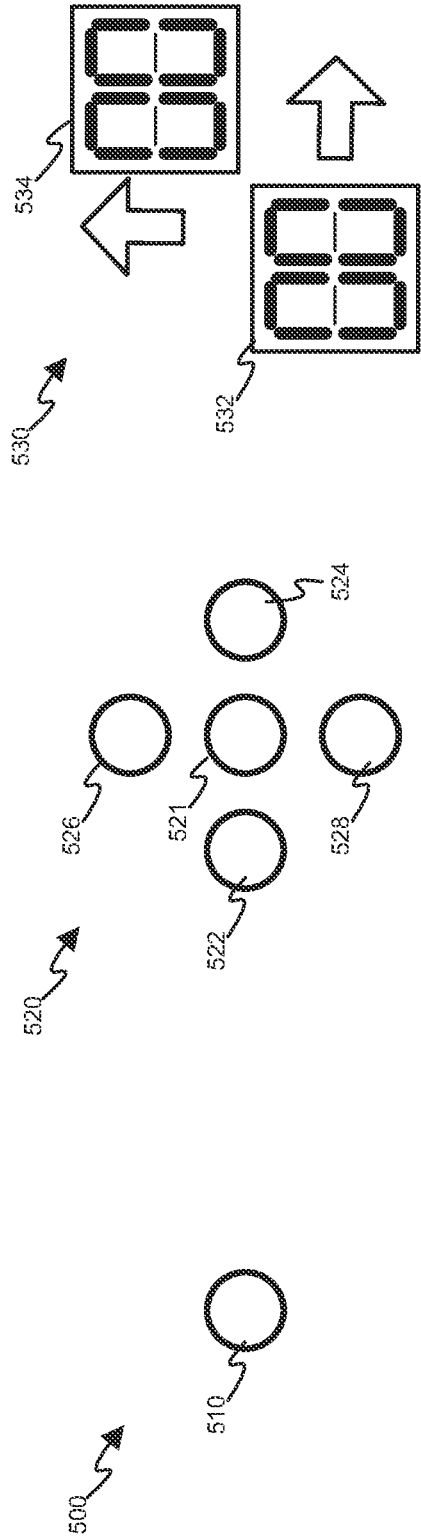

POSITION FEEDBACK CONTROL METHOD AND POWER TOOL

CLAIM OF PRIORITY

The present application is a continuation of U.S. application Ser. No. 16/537,042, filed Aug. 9, 2019, which is a continuation of U.S. application Ser. No. 14/927,932, filed Oct. 30, 2015 (now U.S. Pat. No. 10,377,008). The aforementioned documents are hereby incorporated herein by reference in their entirety.

FIELD OF THE INVENTION

Various embodiments relate to a power tool, and more particularly, to controlling operation of a power tool based on a detected position.

BACKGROUND OF THE INVENTION

Driving screws with a conventional power drill or driver requires careful, manual throttling of the tool to obtain a correct depth. A user of such a power drill or driver must typically release the trigger at precisely the correct moment. Power driving a screw is generally a quick process, which makes precise throttling a challenge for most users. Imprecise throttling generally results in overdriving or underdriving the screw. Overdriving a screw results in the screw being driven too deep and may cause the screw and/or the workpiece into which the screw is driven to fail. Underdriving results in the screw not being driven deep enough, thus requiring restarting the driving process in order to drive the screw flush. However, restarting the driving process, after stopping short of flush, commonly results in slippage of the driver bit, stripping or otherwise damaging the screw, or damaging the workpiece into which the screw is being driven.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

A position feedback control method and power tool using the same are substantially shown in and/or described in connection with at least one of the figures, and are set forth more completely in the claims.

Advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

FIG. 13 depicts one example of an angle indicator for the power tool shown in FIG. 1.

FIG. 14 depicts another example of an angle indicator for the power tool shown in FIG. 1.

FIG. 15 depicts yet another example of an angle indicator for the power tool shown in FIG. 1.

DETAILED DESCRIPTION OF THE INVENTION

Figure 2:
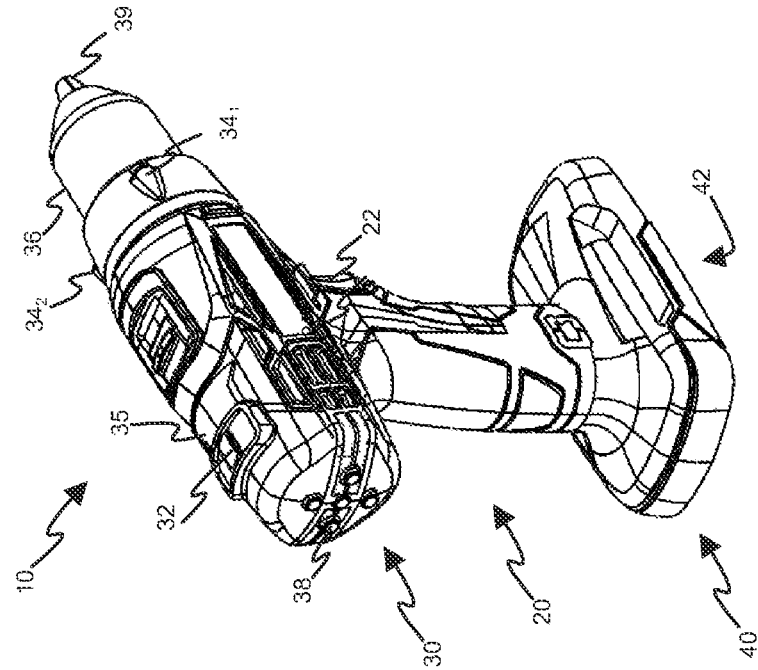
FIG. 2 provides another perspective view of the power tool shown in FIG. 1.
Figure 1:
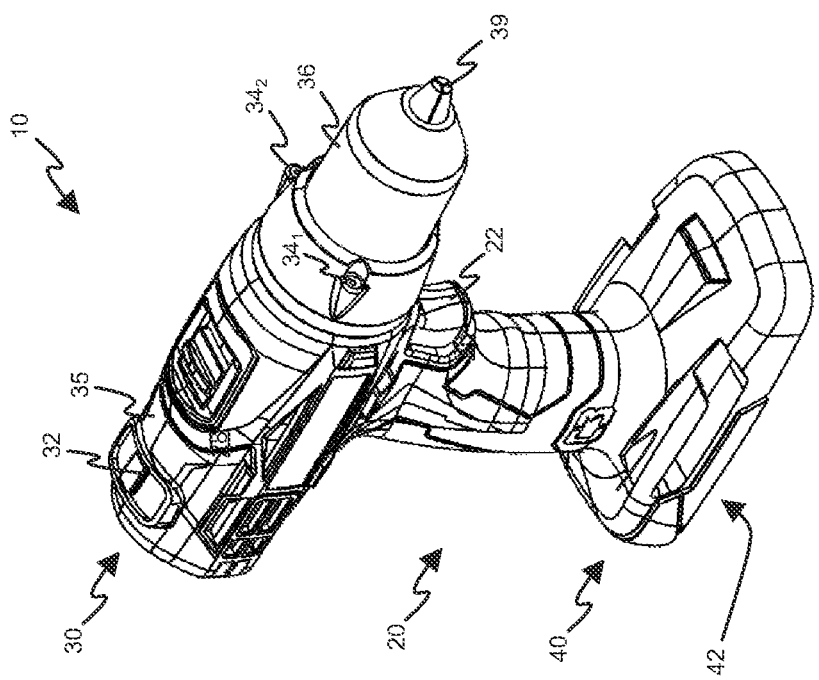
FIG. 1 provides a perspective view of a power tool in accordance with one embodiment.
Figure 4:
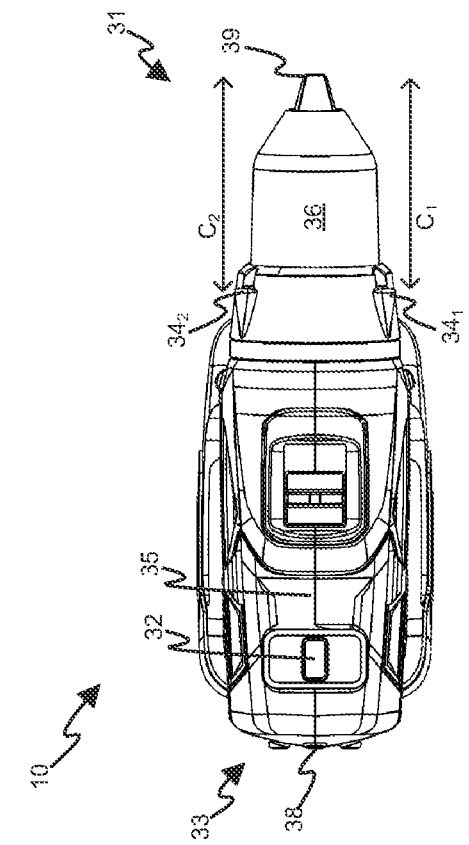
FIG. 4 provides a top view of the power tool shown in FIG. 1.
Figure 3:
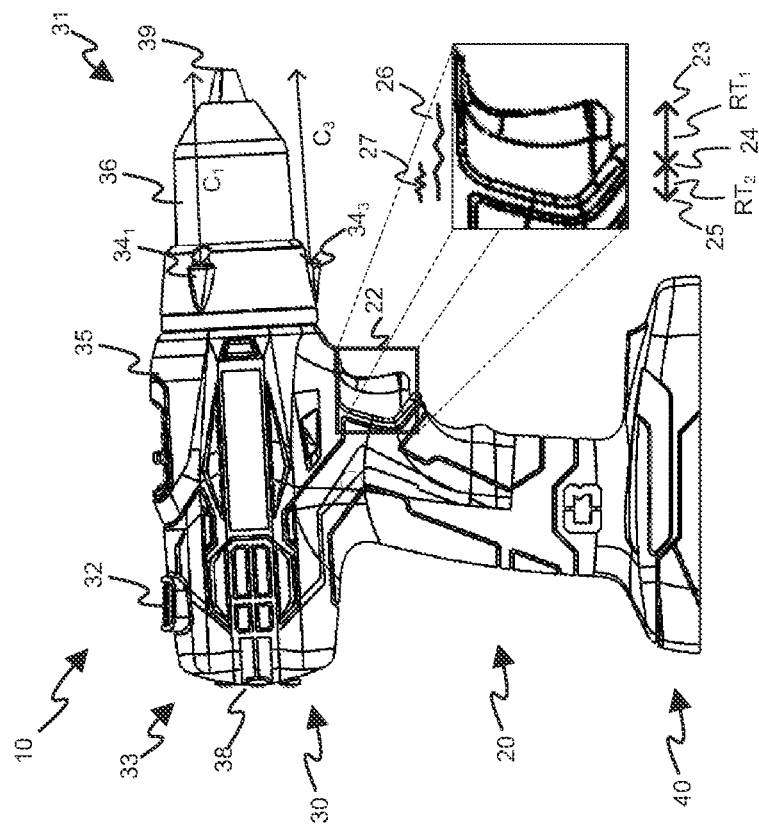
FIG. 3 provides a side view of the power tool shown in FIG. 1 including a magnified view of its trigger.
Figure 6:
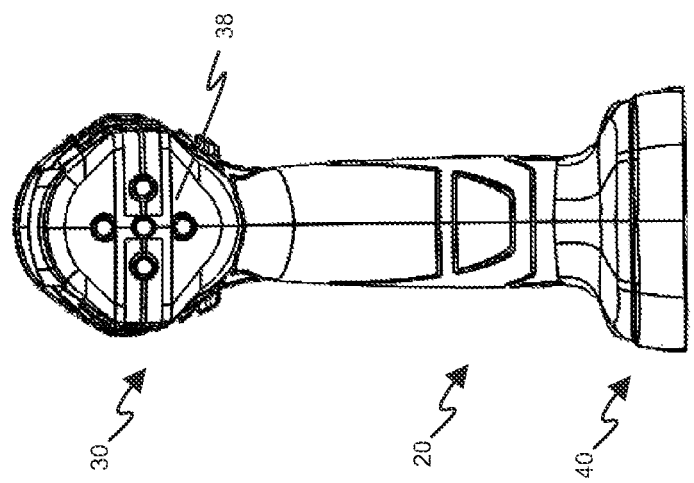
FIG. 6 provides a back view of the power tool shown in FIG. 1.

Aspects of the present invention are generally related to power tools and position feedback controls for such power tools. The following description focuses upon an embodiment of a power drill/driver which may be used to drill a hole into a workpiece when a drill bit is secured by a chuck of the power drill/driver or which may be used to drive a screw into a workpiece when a screw bit is secured by the chuck of the power drill/driver. However, various aspects of the position feedback controls may be applicable to a wide range of power tools such as, for example, drills, drivers, saws, cutters, and hammers.

Referring now to FIGS. 1-6, several external views of a cordless power tool 10 are shown. While a cordless power tool is depicted, various aspects of the below-described power tool 10 may be implemented in a corded power tool as well. As shown, the power tool 10 may comprise a handle 20 coupled between an upper portion 30 and a base portion 40. The base portion 40 may be configured to receive a battery pack, which may be used to power the tool 10. The base portion 40 may further include a lower support 42 capable of maintaining the power tool 10 in an upright position when the power tool 10 is placed upon a horizontal surface.

The handle 20 may provide a surface via which a user may grip and hold the power tool 10. As shown, the handle 20 may include a trigger 22 toward an upper end of the handle 20. The trigger 22 may be positioned such that the user may actuate the trigger 22 by squeezing the trigger 22 with a finger (e.g., index finger) of the hand used to hold the power tool 10.

In some embodiments, the trigger 22 may have a first range of travel $RT_1$ and a second range of travel $RT_2$ which enable a user to select between two modes of operation. A first operating mode may be associated with a first range of travel $RT_1$ between a rest position 23 and a first stop position 24. A second operating mode may be associated with a second range of travel $RT_2$ between the first stop position 24 and a second stop position 25. To demarcate the two operating modes, the trigger 22 may include a first spring 26 and a second spring 27 which cooperate to apply restive forces to the trigger 22. In particular, the first spring 26 may apply a first force to the trigger 22 as it travels along the first range of travel between the rest position 23 and the first stop position 24. The first spring 26 and second spring 27 may cooperate to apply a second force that is greater than the first force to the trigger 22 as it travels along the second range of travel from the first stop position 24 to the second stop position 25. In this manner, the user may need to exert additional force on the trigger 22 in order to cause the trigger 22 to travel past the first stop position 24.

As shown, the upper portion 30 may include a mode selector 32 positioned along a top surface 35. The upper portion 30 may further include position sensors $34_1$, $34_2$, $34_3$ positioned around a chuck 36 toward a front 31 of the power tool 10. The upper portion 30 may further include an angle indicator 38 positioned toward a back 33 of the power tool 10.

In general, the mode selector 32 enables a user to select from among several different operating modes. To this end, the mode selector 32 may include a linear, slide selector that enables the user to linearly, slide the selector among several different positions. Each of the different positions may correspond to a different operating mode of the power tool 10. For example, the mode selector 32, in one embodiment, may provide positions that correspond to various operating modes associated with the position sensors $34_1$, $34_2$, $34_3$. In one embodiment, the mode selector 32 enables selection among an off mode, a blind hole mode, an auto flush mode, a custom flush mode, and a zero mode associated with the position sensors $34_1$, $34_2$, $34_3$.

The off mode generally corresponds to a mode in which the position sensors $34_1$, $34_2$, $34_3$ are turned off, disabled, or otherwise ignored. As such, the power tool 10 operates in a manner akin to a similar power tool without such position sensors $34_1$, $34_2$, $34_3$. The blind hole mode permits a user of the power tool 10 to drill a blind hole to a specified and repeatable depth. The auto flush mode permits a user of the power tool 10 to insert a common style screw, with a common/included length bit, flush into a workpiece. The custom flush mode permits a user of the power tool 10 to repeatably drive a screw flush into a workpiece after a custom zero point has been set. The zero mode permits a user to set the custom zero point for the blind hole mode or the custom flush mode. While some embodiments of the power tool 10 may support each of the above-noted modes, other embodiments may support a subset of these modes, may support additional modes, or may support a subset of these modes as well as additional modes.

As explained above, the mode selector 32 may include a linear, slide selector along a top surface 35 of the upper portion 30. Other embodiments may provide a different location for the mode selector 32 such as, for example, at a different location of the upper portion 30 or in a different portion of the power tool 10 such as the handle 20 or base portion 40. Furthermore, while the mode selector 32 is shown as a linear slide in FIGS. 1-6, other embodiments may use a different type of selector. For example, the mode selector 32 may include a rotary dial, a rotary switch, toggle switch(es), push buttons, radio buttons, etc. that may be actuated in order to select a desired operating mode.

Figure 7:
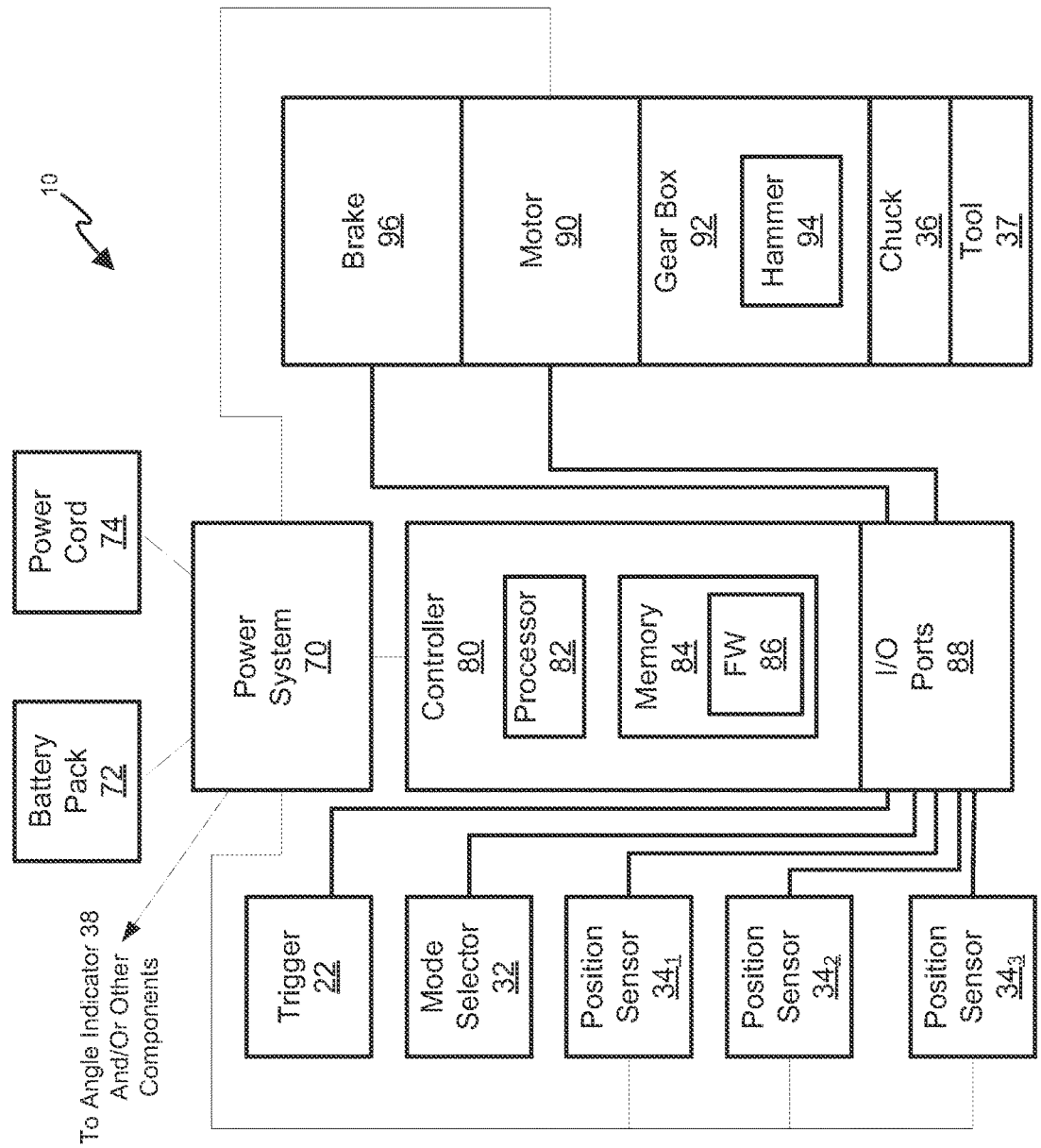
FIG. 7 provides a block diagram back of the power tool shown in FIG. 1.

A high-level, block diagram of the power tool 10 is shown in FIG. 7. As shown, the power tool 10 generally includes a power system 70, a controller 80, and a motor 90. The power system 70 may include terminals, power regulators, power conditioners, and/or other circuitry which are configured to distribute electric power to the controller 80, the motor 90, position sensors $34_1$, $34_2$, $34_3$, angle indicator 38, and possibly other components of the power tool 10. In some embodiments, the power system 70 may be configured to receive batteries or battery pack 72 and deliver power supplied by the received batteries or battery pack to the respective components of the power tool 10. In some embodiments, the power system 70 may include a power cord 74 used to detachably couple the power system 70 to an electrical power outlet so that the power system 70 may deliver power supplied by the electrical power outlet to respective components of the power tool 10.

The motor 90 may comprise a DC motor such as a brushless or brushed DC motor. Moreover, the motor 90 may be coupled to the chuck 36 via a gear box 92. In one embodiment, the gear box 92 includes a hammer 94 that is configured to transfer torque from the motor 90 to the chuck 36 as a series of impacts. In other embodiments, the gear box 92 does not include a hammer 94. In such embodiments, gear box 92 continually transfers torque from the motor 90 to the chuck 36, instead of transferring as a series of impacts. Regardless of the manner of coupling the motor 90 to the chuck 36, the motor 90 generally imparts torque upon the chuck 36 which causes the chuck 36 to rotate a tool 37 (e.g., drill bit, screw driver bit, etc.) held by the chuck 36.

The controller 80 may control logic and circuitry that is generally configured to control operation of the power tool 10. In particular, the controller 80 may receive signals from the trigger 22, mode selector 32, position sensors $34_1$, $34_2$, $34_3$, power system 70, and motor 90. Based on such signals, the controller 80 may control operation of the power tool 10 per an operation mode selected by the mode selector 32. In particular, the controller 80 may control operation of the motor 90 via one or more control signals to the motor 90. Furthermore, the controller 80 may control a brake 96 configured to stop the motor 90 via one or more control signals. Besides controlling the motor 90 and the brake 96, the controller 80 may further determine, based on signals from the position sensors 34, operating angles of the power tool 10 along two axes with respect to a workpiece.

The controller 80 may include a processor 82, memory 84 including firmware 86, and I/O ports 88. In response to executing instructions of the stored firmware 86, the processor 82 may process signals received via I/O ports 88, determine appropriate control signals based on the received signals, and output signals via I/O ports 88 that control operation of the power tool 10. As explained in greater detail below, the processor 82 may determine an operating angle, a drive depth, or both based on signals from position sensors $34_1$, $34_2$, $34_3$ and may adjust operation of the power tool 10 based on such operating angle, drive depth, or both.

Figure 5:
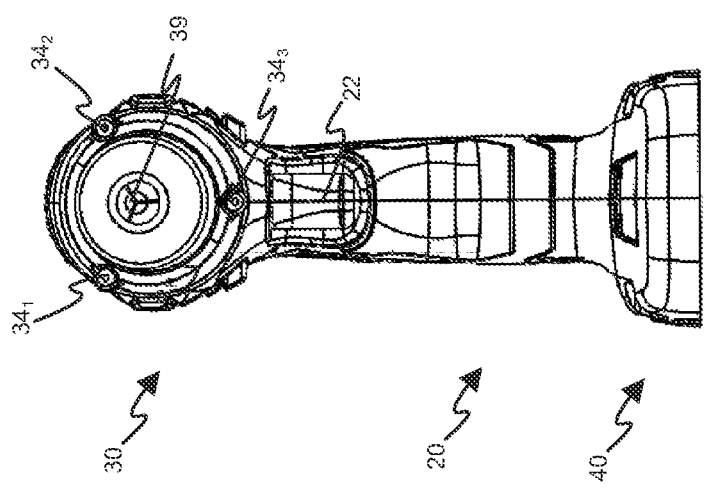
FIG. 5 provides a front view of the power tool shown in FIG. 1.
Figure 8:
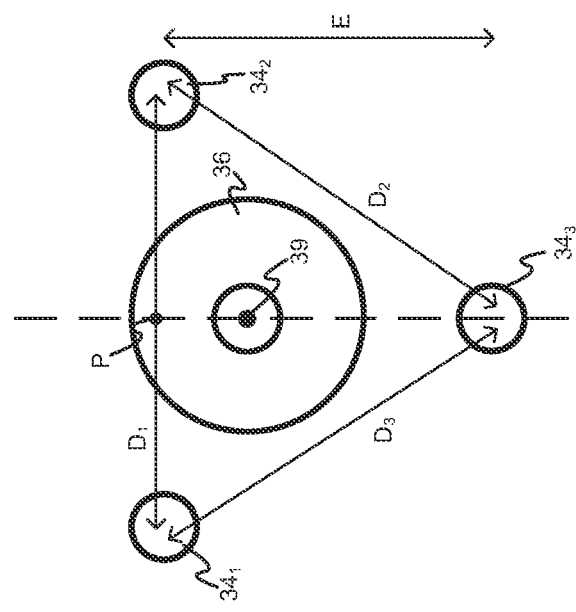
FIG. 8 depicts one orientation of positions sensors for the power tool shown in FIG. 1.

As shown in FIGS. 5 and 8, the power tool 10 may include three position sensors $34_1$, $34_2$, $34_3$ placed in a triangular configuration around the chuck 36. However, power tool 10 in other embodiments may include a different number of position sensors. Each of the position sensors $34_1$, $34_2$, $34_3$ may include one or more radiation sources and one or more radiation receivers which cooperate to detect a distance between the respective sensor and a workpiece. In general, the one or more radiation sources of each position sensor $34_1$, $34_2$, $34_3$ may project a pattern onto a surface of the workpiece. The one or more radiation receivers of each position sensor $34_1$, $34_2$, $34_3$ may receive the reflected pattern and generate a signal indicative of the distance between the sensor $34_1$, $34_2$, $34_3$ and the workpiece. The position sensors $34_1$, $34_2$, $34_3$ may use different types of radiation sources and receivers. For example, the position sensors $34_1$, $34_2$, $34_3$ may operate based on generating and detecting optical, electromagnetic, or acoustic radiation. In one embodiment, the position sensors $34_1$, $34_2$, $34_3$ may be implemented with an STMicroelectronics proximity and ambient light sensing (ALS) module having part number VL6180X. The STMicroelectronics ALS module measures the time light takes to travel to an object and reflect back to the ALS module. The ALS module may then obtain a distance measurement based on the measured time. In another embodiment, the position sensors $34_1$, $34_2$, $34_3$ may be implemented in a manner similar to the optical depth measuring device described in U.S. Pat. No. 4,968,146. Such optical depth measuring devices obtain a distance measurement based on the amount of light reflected back to the device.

In some embodiments, each position sensor $34_1$, $34_2$, $34_3$ may include a single radiation source that projects a visible pattern on the workpiece. Such a visible pattern permits one or more radiation receivers of the respective sensor $34_1$, $34_2$, $34_3$ to receive the reflected pattern and measure a distance to the workpiece based on the received reflected pattern. Moreover, the visible pattern may permit a user of the power tool 10 to confirm that each position sensor $34_1$, $34_2$, $34_3$ is in fact directed at the workpiece of interest. When the power tool 10 is used toward an end or edge of a workpiece, one or more of the position sensors $34_1$, $34_2$, $34_3$ may not be aligned with the workpiece and may be directed off the end or edge. The visible pattern may enable the user to realign or re-position the power tool 10 such that each of the position sensors $34_1$, $34_2$, $34_3$ projects its pattern on the workpiece of interest. Furthermore, the controller 80 may cause the position sensors $34_1$, $34_2$, $34_3$ to alter the displayed pattern when the controller 80 determines that the respective position sensor $34_1$, $34_2$, $34_3$ is not appropriately directed at the workpiece. For example, the controller 80 may cause the pattern to blink when not positioned appropriately and to remain steady when positioned appropriately.

Figure 10:
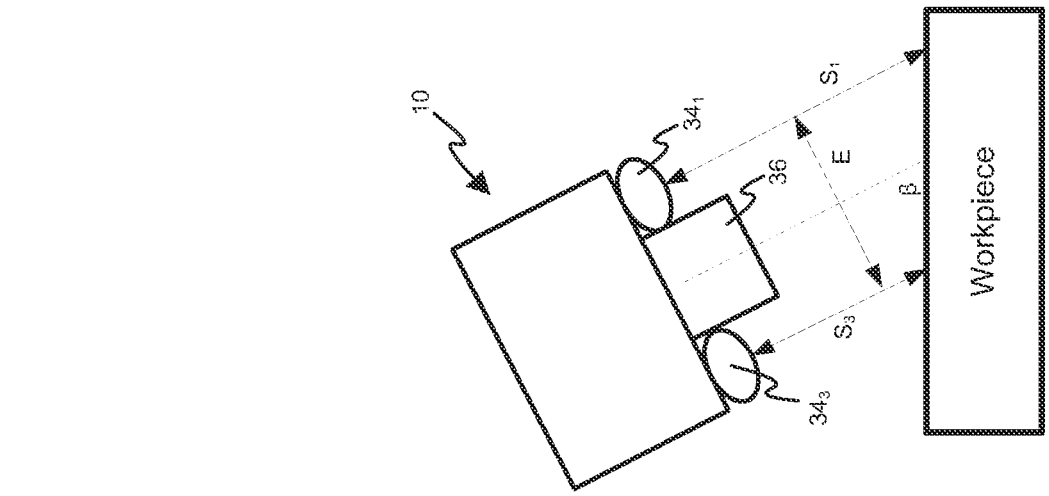
FIG. 10 depicts a second operating angle of the power tool shown in FIG. 1.
Figure 9:
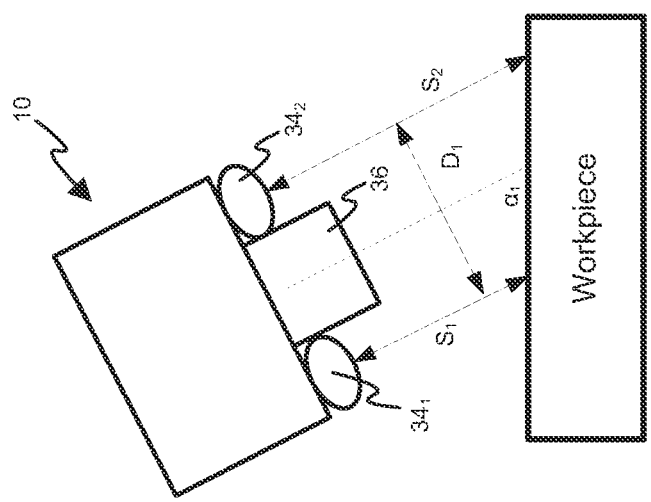
FIG. 9 depicts a first operating angle of the power tool shown in FIG. 1.

As shown in FIGS. 8-10, the first position sensor $34_1$ and second position sensor $34_2$ may be positioned such that the first position sensor $34_1$ is positioned toward the left of the chuck 36 and the second position sensor $34_2$ is positioned toward the right of the chuck 36. Moreover, the first and second position sensor $34_1$, $34_2$ may be positioned such that a center of the first position sensor $34_1$ is a distance $D_1$ from a center of the second position sensor $34_2$. The third position sensor $34_3$ may be positioned directly below the chuck 36 such that a line passing through a center of the third sensor $34_3$ and a center of the chuck 36 evenly bisects the distance $D_1$ between the first and second position sensors $34_1$, $34_2$ at a point P. Moreover, the third position sensor $34_3$ may be positioned such that a center of the third position sensor $34_3$ is a distance E from a line joining the first and second position sensor $34_1$, $34_2$, a distance $D_2$ from the center of the second position sensor $34_2$, and a distance D 3 from the center of the first position sensor $34_1$. Finally, the position sensors $34_1$, $34_2$, $34_3$ may be positioned such that, when the power tool 10 is perpendicular to the workpiece, each of the position sensors $34_1$, $34_2$, $34_3$ is the same distance from the workpiece.

With the position sensors $34_1$, $34_2$, $34_3$ positioned in such a manner, the controller 80 may determine an angle $\square_1$ that corresponds to a left-to-right tilt of the power tool 10 with respect to the workpiece and an angle $\square$ that corresponds to a back-to-front tilt of the power tool 100 with respect to the workpiece. In particular, the controller 10 may determine the angle $\square_1$ per below Equation 1 using distance $S_1$, $S_2$ respectively obtained from sensors $34_1$, $34_2$ and the known distance $D_1$ between sensors $34_1$, $34_2$. The controller 80 may similarly determine an angle $\square_2$ per below Equation 2 using distance $S_2$, $S_3$ respectively obtained from sensors $34_2$, $34_3$ and the known distance $D_2$ between sensors $34_2$, $34_3$. Likewise, the controller 80 may determine an angle $\square_3$ per below Equation 3 using distance $S_1$, $S_3$ respectively obtained from sensors $34_1$, $34_3$ and the known distance D 3 between sensors $34_1$, $34_3$. Finally, the controller 80 may determine an angle $\square$ per below Equation 4 using distance $S_1$, $S_2$, $S_3$ respectively obtained from sensors $34_1$, $34_2$, $34_3$ and the known distance E from the third position sensor $34_3$ to the line connecting the first position sensor $34_1$ and the second position sensor $34_3$.

$$\alpha_1 = \arccos\left(\frac{|S_1 - S_2|}{\sqrt{D_1^2 + (S_1 - S_2)^2}}\right) \quad \text{Equation 1}$$

$$\alpha_2 = \arccos\left(\frac{|S_2 - S_3|}{\sqrt{D_2^2 + (S_2 - S_3)^2}}\right) \quad \text{Equation 2}$$

$$\alpha_3 = \arccos\left(\frac{|S_1 - S_3|}{\sqrt{D_3^2 + (S_1 - S_3)^2}}\right) \quad \text{Equation 3}$$

$$\beta = \arccos\left(\frac{\left|\frac{S_1 + S_2}{2} - S_3\right|}{\sqrt{E^2 + \left(\frac{S_1 + S_2}{2} - S_3\right)^2}}\right) \quad \text{Equation 4}$$

The above Equation 4 is based on the third position sensor $34_3$ equally bisecting the distance between the first and second sensor $34_1$, $34_2$ in the manner describe above. However, Equation 4 may be easily modified to address an embodiment in which the third position sensor $34_3$ is not equidistant between the first and second position sensor $34_1$, $34_2$. In particular, the term $(S_1+S_2)/2$, which corresponds to the average distance detected by the first and second position sensors $34_1$, $34_2$, would change to $(\text{off}_2/D_1)*S_1 + (\text{off}_1/D_1)*S_2$ where $\text{off}_1$ and $\text{off}_2$ respectively correspond to the distance between the point P at which the third position sensor $34_3$ bisects the distance $D_1$ and the respective position sensor $34_1$, $34_2$.

Figure 11:
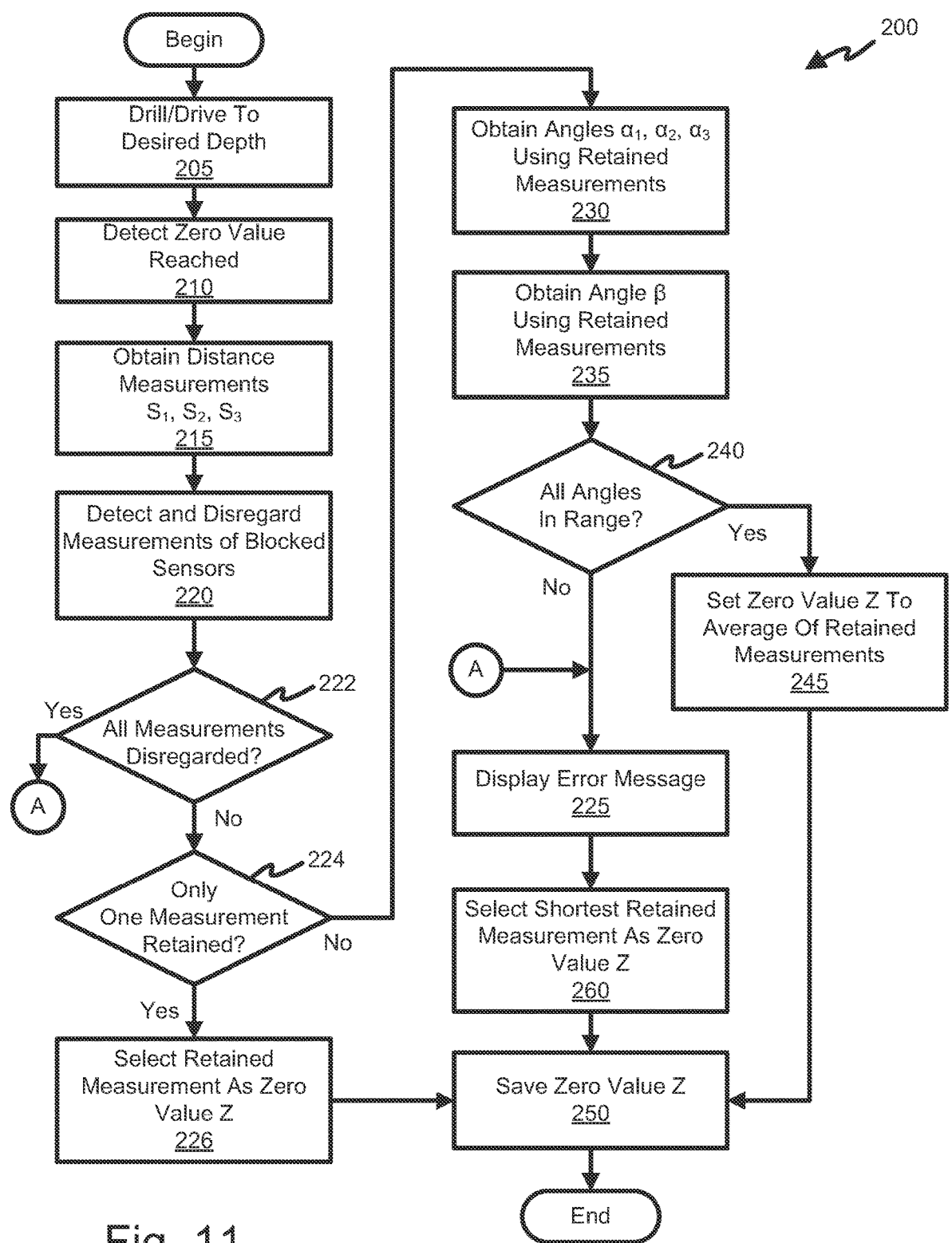
FIG. 11 depicts a flowchart for an example zero mode of operation for the power tool shown in FIG. 1.

Referring now to FIG. 11, a flowchart 200 for a zero mode of operation is shown. As noted above, the power tool 100 in the zero mode of operation may permit a user to set a custom zero value Z for later use by the blind hole mode or the custom flush mode. To this end, the user at 205 may drill a hole or drive a screw to a desired depth. In one embodiment, the power tool 10 is configured to generate an indication as each predetermined depth interval is reached. For instance, the power tool 10 may generate one or more signals that cause a haptic buzz, an audible beep, a visual LED illumination, etc. to occur as each predetermined depth interval (e.g., ¼") is obtained. For example, the power tool 10 may provide a short indication when a ¼" depth is obtained, provide a double short indication when a ½" depth is obtained, provide a short indication when a ¾" depth is obtained, and provide a long indication when a 1" depth is obtained. Based on such indications, the user may manually stop the power tool 10 at the desired depth in order to cause the power tool 10 to set and store the desired zero value Z for future reference. While the power tool 10 may use the same indication as each interval depth is obtained, varying the indications in a manner similar to the above, reduces the likelihood that the user loses count of the number of indications and thus sets the zero value Z for an undesired depth.

The controller 80 at 210 may detect that a user has obtained the desired depth and desires to set the zero value Z. The controller 80 at 215 may obtain a distance measurement $S_1$, $S_2$, $S_3$ for each of the position sensors $34_1$, $34_2$, $34_3$ based on signals received from each of the position sensors $34_1$, $34_2$, $34_3$. The controller 80 at 220 may detect and disregard blocked distance measurement $S_1$, $S_2$, $S_3$. In a work environment, it is not uncommon for dust, dirt, wood particles, etc., to cover one or more of the position sensors $34_1$, $34_2$, $34_3$. Distances less than a distance $C_1$, $C_2$, $C_3$ from the respective position sensor $34_1$, $34_2$, $34_3$ to the distal end 39 of the chuck 36 (FIGS. 3 and 4) may be indicative of the respective sensor $34_1$, $34_2$, $34_3$ being blocked by such particles, may be indicative of a malfunction of the respective sensor $34_1$, $34_2$, $34_3$, or may be indicative that something else is causing an incorrect reading. Accordingly, the controller 80 at 220 may disregard or discard any distance measurement $S_1$, $S_2$, $S_3$ that is less than the distance $C_1$, $C_2$, $C_3$ from the respective sensor $34_1$, $34_2$, $34_3$ to the distal end 39 of the chuck 36.

If the controller 80 determines at 222 that all distance measurements $S_1$, $S_2$, $S_3$ have been disregarded, then controller 80 at 225 may generate signals which present the user with an error or warning message. For example, the controller 80 may present such an error message via the angle indicator 38, via visible patterns projected by the sensors $34_1$, $34_2$, $34_3$, or both.

If the controller 80 determines at 224 that only one of distance measurements $S_1$, $S_2$, $S_3$ was retained or not disregarded, then controller 80 proceeds to 226 in order to select the one retained distance measurement $S_1$, $S_2$, $S_3$ as the custom zero value Z. The controller 80 at 250 may store the obtained zero value Z for future reference.

Otherwise, the controller 80 at 230 may determine, for each pair of retained distance measurements $S_1$, $S_2$, $S_3$, the corresponding angle $\square_1$, $\square_2$, $\square_3$ per Equations 1-3. In one embodiment, if distance measurements $S_1$, $S_2$, $S_3$ were not retained for one or both sensors $34_1$, $34_2$, $34_3$ of a respective pair, then the controller 80 at 230 may set the corresponding angle $\square_1$, $\square_2$, $\square_3$ to a value that indicates that the angle $\square_1$, $\square_2$, $\square_3$ is unknown or that the angle $\square_1$, $\square_2$, $\square_3$ lies outside a predetermined, acceptable range.

At 235, the controller 80 may determine the angle $\square$ per Equation 4. In one embodiment, if distance measurements $S_1$, $S_2$, $S_3$ were not retained for all three sensors $34_1$, $34_2$, $34_3$, then the controller 80 at 235 may set the angle $\square$ to a value that indicates that the angle $\square$ is unknown or that the angle $\square$ lies outside the predetermined, acceptable range.

At 240, the controller 80 may determine whether all of the angles $\square_1$, $\square_2$, $\square_3$, $\square$ lie within of the predetermined, acceptable range. For example, the controller 80 may determine that an angle $\square_1$, $\square_2$, $\square_3$, $\square$ lies within the predetermined, acceptable range if the respective angle is between 75° and 105° degrees, which is ±15° from perpendicular. If all angles $\square_1$, $\square_2$, $\square_3$, $\square$ lie within the predetermined, acceptable range, then the controller 80 may proceed to 245 in order to determine and store the custom zero value Z. In particular, the controller 80 at 245 may average the distance measurements $S_1$, $S_2$, $S_3$ to obtain the custom zero value Z. At 250, the controller 80 may store the obtained value Z in memory 84 for future reference.

If all angles $\square_1$, $\square_2$, $\square_3$, $\square$ do not lie within the predetermined, acceptable range, then the controller 80 at 225 may present an error or warning message to the user via the angle indicator 38, a pattern projected by the position sensors $34_1$, $34_2$, $34_3$, or both. For example, the controller 80 may cause the angle indicator 38 to present an error code, flash an LED, or generate some other visual presentation indicative of an error. Alternatively, or in addition to, the controller 80 may cause the position sensors $34_1$, $34_2$, $34_3$ to project a blinking pattern, a different color pattern, or some other visual depiction that conveys an error or warning message to the user of the power tool 10.

The controller 80 at 260 may then select the shortest retained distance measurement $S_1$, $S_2$, $S_3$ for use as the custom zero value Z. Doing so ensures that the controller 80 does not use measurements $S_1$, $S_2$, $S_3$ that are likely associated with position sensors $34_1$, $34_2$, $34_3$ that are not properly aligned with the workpiece (e.g., projecting their respective radiation off an end or edge of the workpiece). The controller 80 then may proceed to 250 in order to store the obtained zero value Z for future reference.

Figure 12A:
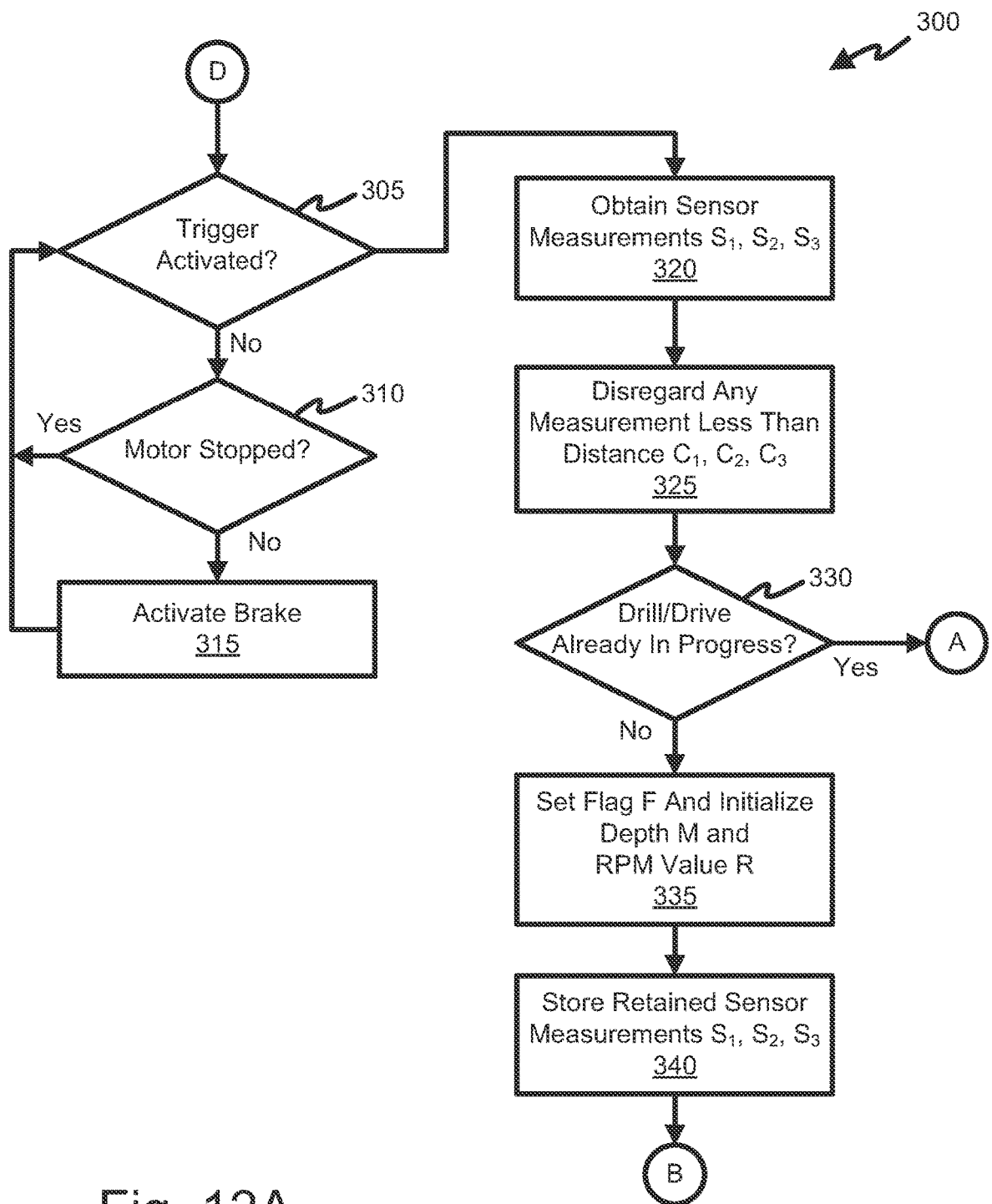
FIGS. 12A-12C depict a flowchart for an example blind hole or auto flush mode of operation for the power tool shown in FIG. 1.
Figure 12B:
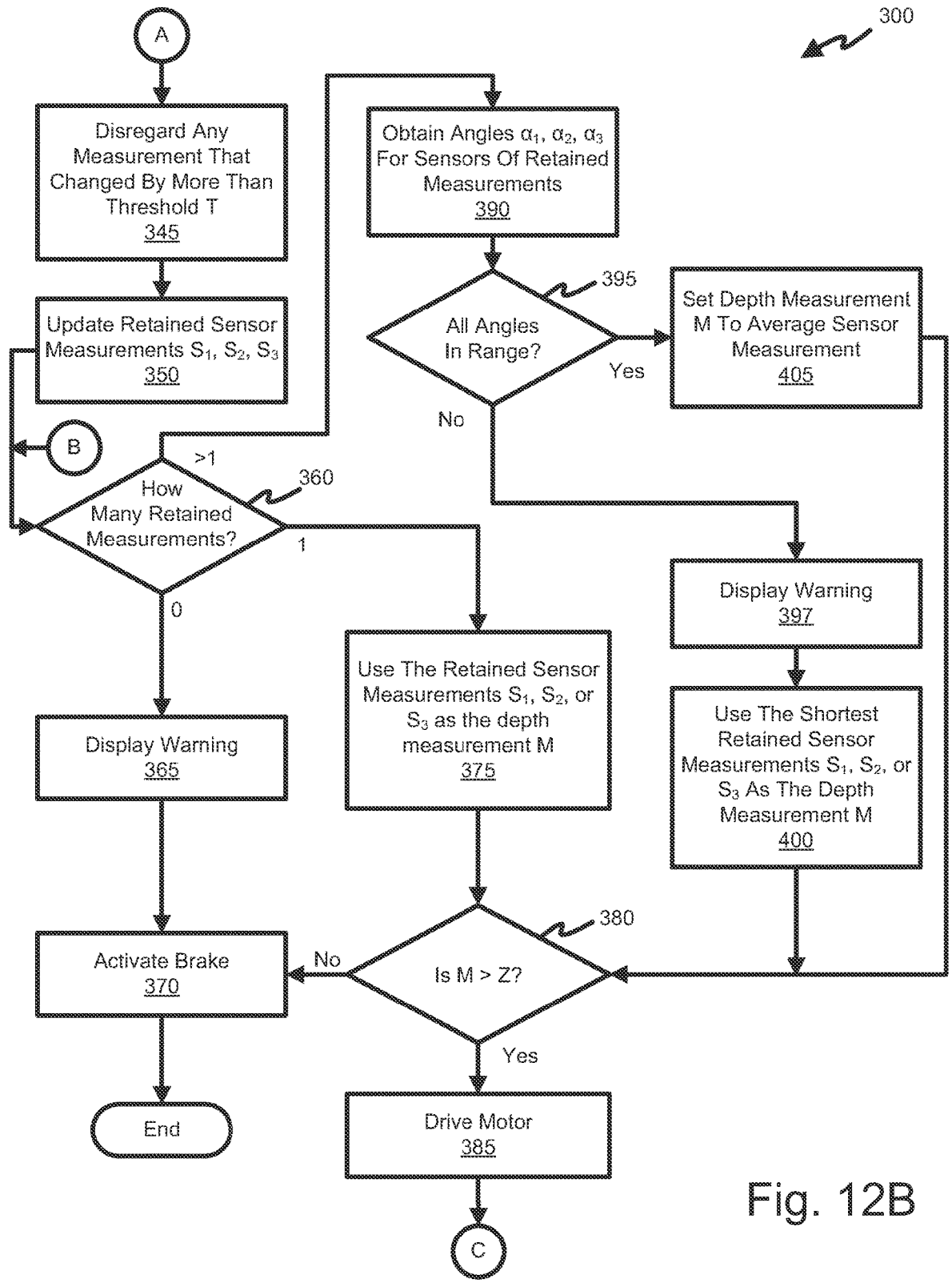

Referring now to FIGS. 12A-12B, a flowchart 300 for one implementation of a control logic for the custom flush mode or the auto flush mode of the power tool 10 is shown. During the custom flush mode, the zero value Z is a custom value set via the process of FIG. 11 or a similar process. During the auto flush mode, the zero value is set based on a common style screw and possibly a user selection that identifies a common style from a set of predefined common styles of screws.

At block 305, the controller 80 may determine whether the trigger 22 is activated. If it is not activated, the controller 80 at 310 may determine whether the motor 90 is stopped. If it is not stopped, then the controller 80 at 315 may activate the brake 96 in order to apply the brake 96 to the motor 90 and stop the motor 90. Otherwise, the controller 80 does nothing and returns to 305 to determine if the trigger 22 is activated.

If the trigger is activated, the controller at 320 may obtain a distance measurement $S_1$, $S_2$, $S_3$ from each of the position sensors $34_1$, $34_2$, $34_3$. The controller 80 at 325 may disregard or discard any distance measurement $S_1$, $S_2$, $S_3$ that is less than a respective chuck distance $C_1$, $C_2$, $C_3$, which corresponds from the respective sensor $34_1$, $34_2$, $34_3$ to the end of the chuck 36 along a line that is normal to the workpiece.

At 330, the controller 80 determines whether a drill/drive process is already in progress. In one embodiment, the controller 80 may make such determination based upon whether a flag F is set. For example, if it is set, then the controller 80 may determine that the power tool 10 is in the middle of driving a screw flush or drilling a hole and may continue to 345. Otherwise, the controller 80 may determine that the power tool 10 is initiating a drill/drive process. In which case, the controller 80 at 335 may initialize control values for the drill/set process. For example, the controller 80 may set the flag F to indicate that the process of driving a screw flush or drilling a blind hole has begun. The controller 80 may further store initial values (e.g., 0) for an initial depth measurement M and an initial revolutions per minute (RPM) value R of the power tool 10. The controller 80 at 340 may store the retained distance measurements $S_1$, $S_2$, $S_3$ in the memory 84 and proceed to 360 in order to determine the number of retained measurements.

At 345, the controller 80 may compare the current distance measurements $S_1$, $S_2$, $S_3$ with previous distance measurements $S_1$, $S_2$, $S_3$ stored in memory 84 and retain the current distance measurements $S_1$, $S_2$, $S_3$ that are not more than a threshold percentage (e.g., 10%) T different than the corresponding previous reading. By disregarding such distance measurements $S_1$, $S_2$, $S_3$, the controller 80 may avoiding basing depth measurements upon distance measurements $S_1$, $S_2$, $S_3$ that do not accurate reflect the depth of the power tool 10. For example, a position sensor S1, S2, S3 during the drilling/driving process may become misaligned and project its radiation off an end or edge of the workpiece or may become blocked by dust and/or debris generated during the drilling/driving process.

The controller 80 at 350 may update stored distance measurements $S_1$, $S_2$, $S_3$ based on the retained distance measurements $S_1$, $S_2$, $S_3$. The controller 80 at 360 may then determine how many distance measurements $S_1$, $S_2$, $S_3$ were retained. If zero distance measurements $S_1$, $S_2$, $S_3$ were retained, then the controller 80 at 365 may generate one or more control signals which may cause the positions sensors $34_1$, $34_2$, $34_3$ and/or the angle indicator 38 to display a warning to the user. The controller 80 at 370 may apply the brake 98, stop the motor 90, and stop the drill/drive process.

If a single measurement $S_1$, $S_2$, $S_3$ was retained, then the controller 80 at 375 may use the retained measurements $S_1$, $S_2$, $S_3$ as the depth measurement M for the power tool 10. At 380, the controller 80 may determine whether the depth measurement M for the power tool 10 is greater than the zero value Z. If greater than the zero value Z, then the controller 80 at 385 may generate one or more signals that cause the motor 90 to drive or continue to drive the chuck 36. Otherwise, the controller 80 at 370 may generate one or more signals which apply the brake 96 and stop the motor 90 prior to clearing the flag F at 385 and exiting the flowchart 300. The controller 80 upon determining at 380 that the depth measurement has reached the zero value Z may further present the user with an indication that the desired depth has been reached. For example, the controller 80 may generate one or more signals which may cause an audible indication via a speaker, bell, striker, etc. and/or a visual indication via lights of, for example, the angle indicator 38.

If two or more measurements $S_1$, $S_2$, $S_3$ were retained, then the controller 80 at 390 may determine the respective angle $\square_1$, $\square_2$, $\square_2$ for each retained pair of measurements $S_1$, $S_2$, $S_3$ per Equations 1-3. At 395, the controller 80 may determine whether all angles $\square_1$, $\square_2$, $\square_2$ are within an acceptable range (e.g., between 75° and 105°). If all angles $\square_1$, $\square_2$, $\square_2$ are not within the acceptable range, then the controller 80 at 397 may generate one or more signals which cause the position sensors $34_1$, $34_2$, $34_3$ and/or the angle indicator 38 to display a warning message to the user. At 400, the controller 80 may set the depth measurement M to the shortest retained distance measurement $S_1$, $S_2$, $S_3$. The controller 80 may then proceed to 380 in order to determine whether the obtained depth measurement M indicates that the power tool 10 has attained the desired depth associated with the stored zero value Z.

If all angles $\square_1$, $\square_2$, $\square_2$ are within the acceptable range, then the controller 80 at 405 may set the depth measurement M to an average of the retained distance measurement $S_1$, $S_2$, $S_3$. The controller 80 may then proceed to 380 in order to determine whether obtained depth measurement M indicates that the power tool 10 has attained the desired depth associated with the stored zero value Z.

Figure 12C:
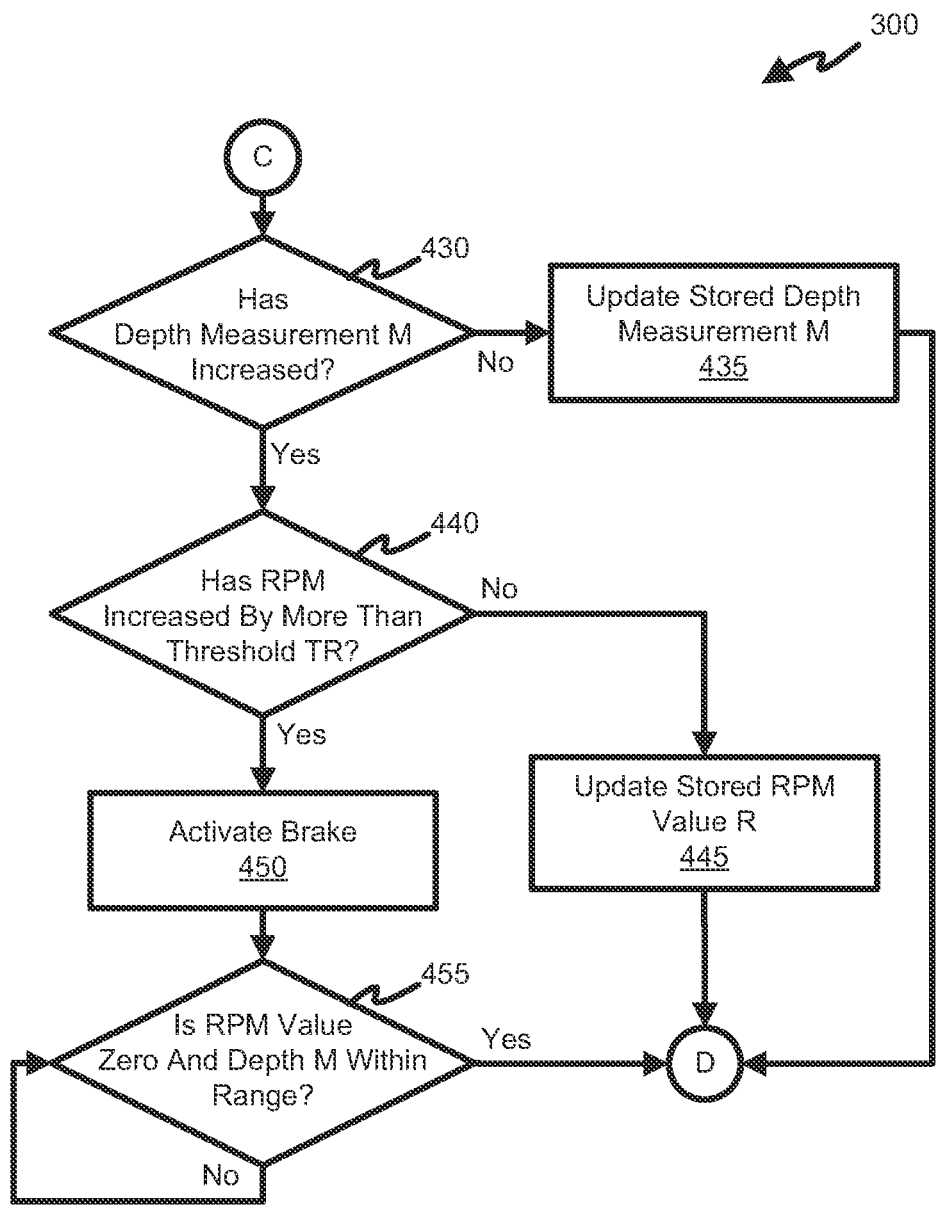

As noted above, if the obtained depth measurement M is greater than the zero value Z, then the controller 80 at 385 may generate one or more signals which cause the motor 90 to drive or continue to drive the chuck 36. Then, the controller 80 as depicted in FIG. 12C may protect the power tool 10 from cam-out. In particular, the controller 80 at 430 may determine whether the obtained depth measurement M is greater than the previously stored depth measurement M. If the depth measurement M has increased, then a cam-out condition, in which the driver bit has slipped from the head of the screw, may have occurred power tool 10. In which case, the controller 80 may proceed to 440 to further check for a cam-out condition. Otherwise, the controller 80 at 435 may update the stored depth measurement M and return to 305 to check the status of the trigger 22.

At 440, the controller 80 may compare the current RPM value of the motor 90 to the stored RPM value R to determine whether the RPM value of the motor 90 has increased by more than a threshold RPM value (e.g., 100 RPM) TR. In one embodiment, the motor 90 is implemented with a brushless DC motor with internal circuitry that controls the rate of the motor 90. In such embodiments, the controller 80 may obtain the current RPM value from such internal circuitry of the motor 90. In other embodiments, the power tool 10 may include an inductive sensor on the motor 90 that provides the controller 80 with one or more signals indicative the current RPM value of the motor 90. If the RPM value has not increased by more than the threshold RPM value TR, then controller 80 may determine that a cam-out condition has not occurred. As such, the controller 80 at 445 may update the stored RPM value R and proceed to 305 to check the status of the trigger 22.

However, if the RPM value has increased by more than the threshold RPM value TR, then the controller 80 may determine that a cam-out condition has occurred. Accordingly, the controller 80 at 450 may generate one or more control signals which apply the brake 96 and stop the motor 90. The controller 80 at block 455 may wait until the current RPM value is zero and an average of the sensor measurements $S_1$, $S_2$, $S_3$ is within a threshold level (e.g., 0.063 inches) TM of the stored depth measurement M. After determining the current RPM value and the average of the sensor measurements $S_1$, $S_2$, $S_3$ are within the threshold level TM, the controller 80 may proceed to 305 to check the status of the trigger 22.

As explained above, the controller 80 applies the brake 96 and stops the motor 90 when the zero value Z is reached. In one embodiment, a user via the trigger 22 may cause the controller 80 to further drive the motor 90 per a finishing or incremental mode of operation. For example, the user can over-travel the trigger 22 such that the trigger 22 moves past the first stop position 24 and to the second stop position 25 in order to select the finishing mode of operation. In another embodiment, the user can continue to hold the trigger 22 for a predetermined time after the zero value Z is reached in order to select the finishing mode of operation.

In the finishing mode of operation, the controller 80 may cause the motor 90 to drive the chuck 36 at a finishing rate which causes the chuck 36 to turn at a slower rate than the normal operating rate until the trigger 22 is released. For example, for an impact tool, the controller 80 may cause the hammer 94 via the motor 90 to impact the chuck 36 at a slower finishing rate (e.g., 1 impact/second). For a non-impact tool, the controller 80 may cause the motor 90 to rotate the chuck 36 at a slower finishing rate (e.g., ¼ turn/second). Such a slower finishing rate permits further driving of the screw into the workpiece while reducing the odds of cam-out and making it easier for the user to control the power tool 10 such that the screw is driven flush into the workpiece without overdriving.

Referring now to FIGS. 13-15, a few different example embodiments of the angle indicator 38 are shown. In FIG. 13, an angle indicator 500 is shown which comprises a single indicator light 510. In such an embodiment, the controller 80 may generate signals which continually illuminate the light 510 when the power tool 10 is perpendicular or within an acceptable range (e.g., is ±15°) of perpendicular to the workpiece. The controller 80 may further generate signals which cause the light 510 to convey messages (e.g., warning and/or error messages) to the user via various blinking patterns of the light 510.

In FIG. 14, an angle indicator 520 is shown which includes a central indicator light 521 as well as a left indicator light 522, a right indicator light 524, a top indicator light 526, and bottom indicator light 528. The controller 80 may generate signals which drive the central indicator light 521 in a manner similar to the indicator light 510 of FIG. 15. Namely, the controller 80 may continually illuminate the central indicator light 521 when the power tool 10 is within an acceptable range of being perpendicular to the workpiece. When the power tool 10 is not in an acceptable range of being perpendicular, the controller 80 may illuminate respective one or ones of the indicator lights 522, 524, 526, 528 to indicate in which direction the power tool 10 is out of alignment. By illuminating the indicator lights 522, 524, 526, 528, the controller may help the user to realign the power tool 10 such that it is within the acceptable range of being perpendicular to the workpiece.

In FIG. 15, an angle indicator 530 is shown having a first display 532 and a second display 534. In one embodiment, each display 532 and 534 comprises a two-digit, seven segment display. The controller 80 may generate control signals which cause the displays 532, 534 to present the determined angles □ and □. In one embodiment, the angle □ corresponds to a left-and-right angle of the power tool 10 and the angle □ corresponds to an up-and-down angle of the power tool 10. In such an embodiment, the display 532 may depict the left-and-right or □ angle and the display 534 may depict the up-and-down or □ angle. Besides displaying the respective angles, the controller 80 may further cause the displays 532, 534 to display one or more messages (e.g., warning or error messages). Such messages may include one or more numeric symbols, alphabetic symbols, or other symbols. The controller 80 may further cause displays 532, 534 to present various blinking patterns to further convey messages to the user.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A power tool, comprising:
   a chuck configured to secure a tool;
   a motor configured to rotate the chuck and the tool secured to the chuck;
   a sensor configured to determine a current distance between the sensor and a workpiece; and
   a controller configured to:
      generate a percent difference between the current distance and a previously determined distance,
      retain the current distance only if the percent difference is less than or equal to a threshold percentage, and
      determine a measurement, of a drive depth of the tool into the workpiece, according to the current distance.

2. The power tool of claim 1, wherein the controller generates an indication of drive depth by generating one or more signals that cause a haptic buzz as each predetermined interval of drive depth is reached.

3. The power tool of claim 1, wherein the controller is configured to generate an indication of drive depth by generating one or more signals that cause an audible beep as each predetermined interval of drive depth is reached.

4. The power tool of claim 1, wherein the controller is configured to generate an indication of drive depth by generating one or more signals that cause a visual illumination as each predetermined interval of drive depth is reached.

5. The power tool of claim 1, wherein the controller is configured to generate an indication of drive depth by generating one or more signals that cause a same indication as each predetermined interval of drive depth is reached.

6. The power tool of claim 1, wherein the controller is configured to generate an indication of drive depth by generating one or more signals that vary the indication as different predetermined intervals of drive depth are reached.

7. The power tool of claim 1, wherein the controller is configured to:
   set a zero value, and
   during a subsequent driving of the tool into the workpiece, stop the motor in response to the current distance indicating that the zero value has been reached.

8. The power tool of claim 1, comprising:
   a different sensor configured to sense a different distance between the different sensor; and
   wherein the controller is configured to determine the measurement of the drive depth of the tool into the workpiece according to the different signal.

9. The power tool of claim 8, wherein the controller is configured to determine the measurement of the drive depth according to both the current distance and the different distance.

10. The power tool of claim 9, comprising:
   a display device, wherein the controller is configured to:
   determine an angle of the tool with respect to the workpiece; and
   generate one or more signals that cause the display device to present the angle of the tool.

* * * * *